March 23, 1954
G. E. ROLLER
2,673,108
ELECTROMAGNETIC DOOR LOCK
Filed Oct. 19, 1950
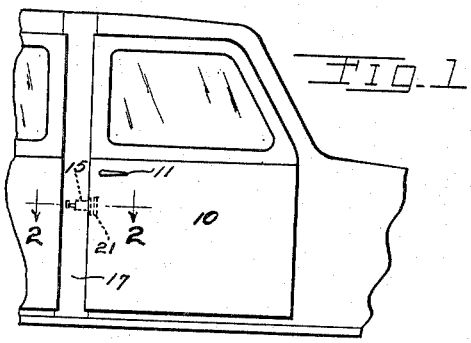
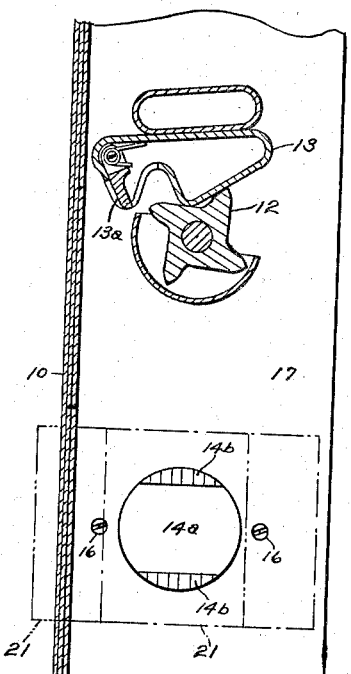
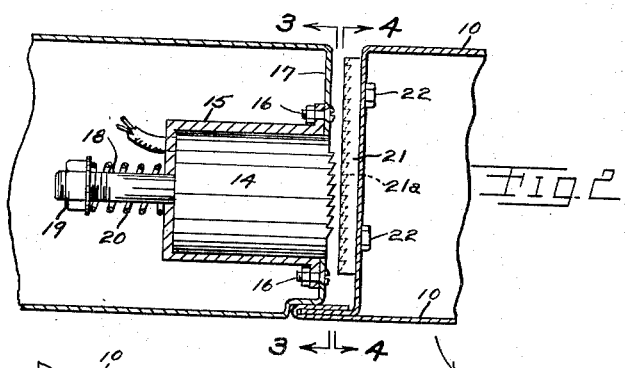
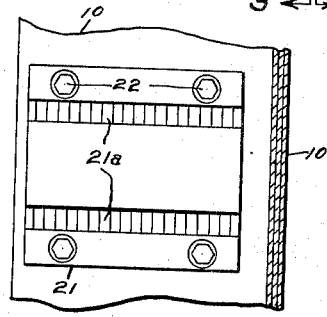
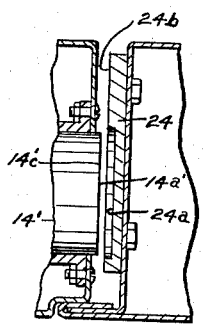
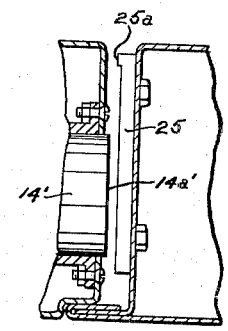
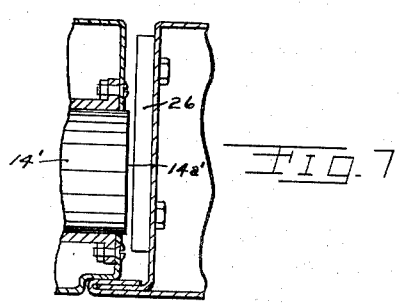
INVENTOR.
GEORGE E. ROLLER
BY
Hyde, Meyer, Baldwin & Doran
ATTORNEYS Patented Mar. 23, 1954

2,673,108

UNITED STATES PATENT OFFICE 2,673,108

ELECTROMAGNETIC DOOR LOCK

George E. Roller, Cleveland Heights, Ohio

Application October 19, 1950, Serial No. 191,020

8 Claims. (Cl. 292—144)

This invention relates to an electromagnetic safety lock for an automobile door.

An object of the present invention is to provide an electromganetic safety lock for an automobile door which is independent of the manually operated door lock.

Another object of the present invention is to provide an electromagnetic safety lock for an automobile door which is effective to maintain the door closed even though the manually operated door lock becomes unlatched.

Another object of the present invention is to provide an electromagnetic safety lock for an automobile door which will prevent the automobile door from being opened, from either the inside or outside, as long as the electromagnetic safety lock is in operative condition.

Another object of the present invention is to provide an electromagnetic safety lock for an automobile door which can readily be installed on any automobile.

Other objects and advantages of my invention will be apparent from the accompanying drawings and description, and the essential features thereof will be set forth in the appended claims.

In the drawings—

Fig. 1 is a fragmentary side elevational view of an automobile on which my electromagnetic safety lock is mounted;

Fig. 2 is a sectional view enlarged on the line 2—2 of Fig. 1;

Figs. 3 and 4 are sectional views on the lines 3—3 and 4—4 respectively of Fig. 2;

Fig. 5 is a sectional view similar to Fig. 2 but showing a modification;

Fig. 6 is a sectional view similar to Fig. 2 but showing another modification; while Fig. 7 is a sectional view similar to Fig. 2 and showing still another modification.

My novel electromagnetic safety lock may be mounted on any automobile door regardless of the type of manual door lock with which said automobile door is provided and for purposes of illustration I show a rotary bolt lock such as shown in Patents Nos. 2,195,179 and 2,198,548, issued to Rollo Marple to which reference may be had if necessary.

The automobile door 10 is provided with the usual handle 11. As is usual, when handle 11 is operated a dog (not shown) is released which permits the bolt 12, mounted on the door, to turn freely on its axis. When the door is pulled open the bolt 12 rotates to clear the keeper 13, mounted on the door post, and the safety catch 13a, all as described in the above mentioned patents.

To prevent the door from being accidentally opened while the automobile is in motion or to prevent unauthorized entry into the automobile while stopping, as by a traffic signal, I provide an electromagnet 14 housed for reciprocation in a sleeve 15, of non-magnetic material, which is suitably fastened, as by bolts 16 to the car post or body 17.

A stud 18, fixed to electromagnet 14, extends rearwardly through sleeve 15 and has a nut 19 adjustably threaded thereon. A spring 20 interposed between the sleeve 15 and nut 19 biases the said electromagnet to the left as viewed in Fig. 2.

An armature 21 of magnetizable material, such as steel, is secured to the door 10 by bolts 22 for cooperation with the electromagnet 14. The co-acting faces 14a of the electromagnet and 21 of the armature may be flat and will give good results. However, to give a better holding effect, the face 14a of the electromagnet 14 is provided with two rows of teeth or projections 14b which are adapted to engage the indentations 21a in the armature 21.

When the electromagnet 14 is energized through wires 23, the electromagnet will be attracted to the armature 21 and will move to the right against the bias of spring 20. The teeth 14b will enter the matching indentations 21a to positively hold the door closed so long as the electromagnet remains energized.

The electromagnet 14 is energized by the usual automobile storage battery, with which the automobile is provided, controlled by a switch preferably placed adjacent the driver of the automobile. The electromagnet 14 may also be connected in circuit with the ignition switch so that whenever the ignition switch is "on" my electromagnetic safety lock is effective to hold the door closed.

As will be apparent, the electromagnet 14 will move to the left when deenergized and the door may be opened in the usual manner.

My electromagnetic safety lock is effective to hold the door closed even though the door is only closed to the "safety latch" position wherein the bolt 12 engages the safety catch 13a and is also effective to hold the door against full opening with the door opened beyond the "safety latch" position.

As shown in Fig. 3, the position of armature 21 with respect to the electromagnet 14, when the door is fully closed, is shown in dot-dash lines. The dot-dot-dash lines indicate the position of armature 21 with the door in the "safety latch"

position and as shown the armature 21 is large enough to provide full contact with the face 14a of the electromagnet 14 in this "safety latch" position.

In the modification shown in Fig. 5 the electromagnet 14' has a flat face 14a' and the armature 24 has a shallow recess 24a adapted to receive the nose 14c' of the electromagnet 14' upon energization of the electromagnet. The flat surface 24b of the armature is available to hold the flat nose 14a' of the electromagnet if the door is open too far for the recess 24a to register with the nose 14a'.

In Fig. 6 the armature 25 is provided with a shoulder 25a along the vertical inner edge. In this embodiment the attraction between the energized electromagnet 14' and the armature 25 is intended to hold the door closed but the shoulder 25a provides an additional safety feature so that the door, in any event, even if nose 14a' slipped on the flat surface of armature 25, could only be opened until the shoulder 25a engaged the nose of the electromagnet 14'.

In Fig. 7, I show a plain armature 26 adapted to engage the face 14a' of the electromagnet 14'. With the proper electromagnet 14', such a powerful holding force is exerted between the armature 26 and the electromagnet 14' that the door cannot be pulled open even though the mating surfaces are flat. Here again the armature 26 is of such extent laterally that it will hold the door in fully locked position, in safety latch position, or even open slightly beyond safety latch position.

I have thus provided an electromagnetic safety lock which may be readily and cheaply mounted on any existing automobile and which positively prevents accidental or unauthorized opening of the automobile door or doors.

Other advantages will be apparent to those skilled in the art.

What I claim is:

1. In an assembly including an automobile body member and a door member hingedly mounted on said body member; the combination therewith of an electromagnet mounted on one of said members, means for energizing said electromagnet, an armature mounted on the other of said members and adapted to cooperate with said electromagnet, said electromagnet and said armature forming mutually attracted magnetic holding parts, one of said parts being reciprocally mounted with respect to said other part, whereby when said electromagnet is energized the said reciprocally mounted part is attracted to said other part to hold said door closed, and the mutually engaging surfaces of said parts being substantially smooth so that they can be forced to slide relative to each other even when magnetically attracted.

2. In an assembly including an automobile body member and a door member hingedly mounted on said body member, wherein the free edge of said door has a wall extending in the direction of the thickness of said door, and a wall on said body member substantially parallel to and adjacent the said wall of the said door when the said door is closed; the combination therewith of an electromagnet mounted on one of said walls, means for energizing said electromagnet, an armature mounted on the other of said walls and adapted to cooperate with the said electromagnet, the said electromagnet and the said armature forming mutually attracted magnetic holding parts, one of said parts being reciprocally mounted with respect to said other part, whereby when the said electromagnet is energized the said reciprocally mounted part is attracted to the said other part to hold the said door closed, and the mutually engaging surfaces of said parts being substantially smooth so that they can be forced to slide relative to each other even when magnetically attracted.

3. In an assembly including an automobile body member and a door member hingedly mounted on said body member, wherein the free edge of said door has a wall extending in the direction of the thickness of said door, there being a wall on said body member substantially parallel to and adjacent the said wall of the said door when the said door is closed; the combination therewith of a bolt mounted on the said wall of the said door member, a keeper mounted on the said wall of said body member for cooperation with the said bolt to hold the said door closed, the said bolt and said keeper having a fully latched and a safety latched position, an electromagnet mounted on one of said walls, means for energizing said electromagnet, an armature mounted on the other of said walls and adapted to cooperate with the said electromagnet, the said electromagnet and the said armature forming mutually attracted magnetic holding parts, and one of said parts being reciprocally mounted with respect to said other part, whereby when the said electromagnet is energized the said reciprocally mounted part is attracted to the said other part to hold the said door closed, and the said magnetic holding parts having sufficient width to provide engagement of the magnetic holding parts when the said door is in either the said fully latched or the said safety latched position.

4. In an assembly including an automobile body member and a door member hingedly mounted on said body member, wherein the free edge of said door has a wall extending in the direction of the thickness of said door, and a wall on said body member substantially parallel to and adjacent the said wall of the said door when the said door is closed; the combination therewith of an electromagnet mounted on one of said walls, means for energizing said electromagnet, an armature mounted on the other of said walls and adapted to cooperate with the said electromagnet, the said electromagnet and the said armature forming mutually attracted magnetic holding parts, one of said parts having projecting teeth, the other of said parts being provided with indentations adapted to engage said teeth, and one of said parts being reciprocally mounted with respect to said other part, whereby when the said electromagnet is energized the said reciprocally mounted part is attracted to the said other part and the said indentations engage said teeth to hold the said door closed.

5. In an assembly including an automobile body member and a door member hingedly mounted on said body member, wherein the free edge of said door has a wall extending in the direction of the thickness of said door, there being a wall on said body member substantially parallel to and adjacent the said wall of the said door when the said door is closed; the combination therewith of a bolt mounted on the said wall of the said door member, a keeper mounted on the said wall of said body member for cooperation with the said bolt to hold the said door closed, the said bolt and said keeper having a fully latched and a safety latched position, an electromagnet mounted on one of said walls, means for energizing said electromagnet, an armature mounted on the other of said walls and adapted to cooperate with the said electromagnet, the said electromagnet and the said armature forming mutually attracted magnetic holding parts, and one of said parts being reciprocally mounted with respect to said other part, whereby when the said electromagnet is energized the said reciprocally mounted part is attracted to the said other part to hold the said door closed, said electromagnet being opposite said armature when said door is in either fully latched or safety latched position, and said armture having a projecting shoulder along a vertical edge thereof adapted to engage the said electromagnet in door-holding position when the said door is in the said safety latched position.

6. In an assembly including an automobile body member and a door member hingedly mounted on said body member, wherein the free edge of said door has a wall extending in the direction of the thickness of said door, there being a wall on said body member substantially parallel to and adjacent the said wall of the said door when the said door is closed; the combination therewith of a bolt mounted on the said wall of the said door member, a keeper mounted on the said wall of the said body member for cooperation with the said bolt to hold the said door closed, the said bolt and said keeper having a fully latched and a safety latched position, an electromagnet mounted on one of said walls, means for energizing said electromagnet, an armature mounted on the other of said walls and adapted to cooperate with said electromagnet, the said armature being provided with a shallow recess to receive the said electromagnet, said armature having another surface outwardly from said recess, the said electromagnet and the said armature forming mutually attracted magnetic holding parts, and one of said parts being reciprocally mounted with respect to the said other part, whereby when the said electromagnet is energized the said reciprocally mounted part is attracted to the said other part, said electromagnet being opposite said recess when said door is fully latched and being opposite said other surface when said door is safety latched.

7. In an assembly including an automobile body member and a door member hingedly mounted on said body member, wherein the free edge of said door has a wall extending in the direction of the thickness of said door, there being a wall on said body member substantially parallel to and adjacent the said wall of the said door when the said door is closed; the combination therewith of a bolt mounted on the said wall of the said door member, a keeper mounted on the said wall of the said body member for cooperation with the said bolt to hold the said door closed, the said bolt and said keeper having a fully latched and a safety latched position, an electromagnet mounted on one of said walls, means for energizing said electromagnet, an armature mounted on the other of said walls and adapted to cooperate with said electromagnet, the said armature being provided with a shallow recess to receive the said electromagnet, the said electromagnet and the said armature forming mutually attracted magnetic holding parts, and one of said parts being reciprocally mounted with respect to the said other part, whereby when the said electromagnet is energized the said reciprocally mounted part is attracted to the said other part to hold the said door closed, said electromagnet being opposite said recess when said door is fully latched and being opposite said armature outside said recess when said door is in safety latched position, and the said armature having sufficient area around the said recess to provide sufficient abutting engagement with the said electromagnet when the said door is in safety latched position to prevent the said door from being fully opened.

8. In an assembly including an automobile body member and a door member hingedly mounted on said body member, wherein the free edge of said door has a wall extending in the direction of the thickness of said door, there being a wall on said body member substantially parallel to and adjacent the said wall of the said door when said door is closed, and there being a bolt mounted on the said wall of said door member, and a keeper mounted on said wall of said body member for cooperation with said bolt to hold said door closed, said bolt and said keeper having a fully latched and a safety latched position; the combination therewith of an electromagnet mounted on one of said walls, means for energizing said electromagnet, an armature mounted on the other of said walls and adapted to cooperate with said electromagnet, the said electromagnet and said armature forming mutually attracted magnet holding parts, one of said parts being reciprocately mounted with respect to said other part, whereby when said electromagnet is energized said reciprocately mounted part is attracted to said other part to hold said door closed, and said electromagnet being opposite said armature when said door is in either fully latched or safety latched position.

GEORGE E. ROLLER.

References Cited in the file of this patent

UNITED STATES PATENTS

| Number | Name | Date |
| --- | --- | --- |
| 1,085,347 | Leduc | Jan. 27, 1914 |
| 2,198,549 | Marple | Apr. 23, 1940 |
| 2,519,197 | Preston | Aug. 15, 1950 |